June 28, 1966   H. G. SPIER   3,258,618
MAGNETOHYDRODYNAMIC INTERNAL COMBUSTION ELECTRIC GENERATOR
Filed July 18, 1962   3 Sheets-Sheet 3

INVENTOR.
HANS G. SPIER
BY Arthur H. Seidel
ATTORNEY

United States Patent Office 3,258,618
Patented June 28, 1966

3,258,618
MAGNETOHYDRODYNAMIC INTERNAL COMBUSTION ELECTRIC GENERATOR
Hans G. Spier, Media, Pa., assignor to Baldwin-Lima-Hamilton Corporation, Philadelphia, Pa., a corporation of Pennsylvania
Filed July 18, 1962, Ser. No. 210,653
14 Claims. (Cl. 310—11)

In general, this invention relates to the generation of electric power directly from combustion power without the necessity of converting combustion power into mechanical power. More particularly, it relates to the generation of electrical energy during the combustion stroke of an internal combustion engine.

In a magnetohydrodynamic generator, currents are induced in a moving gas by virtue of its motion through a magnetic field. The gas has an electromotive force generated in it which drives current through it. This current is normally received by electrodes between which the gas passes and fed to an external load. The most important quantity determining the feasability and characteristics of magnetohydrodynamic generators is the gas conductivity. The gas will conduct if a certain, usually relatively small, fraction of its atoms or molecules become ionized, i.e. lose electrons. This ionization may occur due to the absorption of several types of radiation or due to an applied electric field as in low pressure gas discharges, or it may come about as a result of heating the gas.

This last mentioned means of ionizing a gas is at present the most practical. When a gas is only about .1% ionized, it is very nearly as good a conductor as it would be if it were completely ionized.

Most gases do not ionize appreciably until quite high temperatures are reached. The other two factors in determining the output of a magnetohydrodynamic generator are the gas velocity and the strength of the magnetic field. It is essential, therefore, in designing a magnetohydrodynamic generator to provide high temperature gas at high velocity passing through a strong magnetic field.

It is therefore the general object of this invention to provide a new and improved magnetohydrodynamic generator which utilizes an internal combustion engine to achieve high temperature high velocity gas flow in a magnetic field.

Another object of this invention is to provide a more direct and more efficient generation of electric power impulses utilizing the magnetohydrodynamic principles by utilizing the gases during the combustion period of an internal combustion engine and passing them through a strong magnetic field.

A further object of this invention is the provision of a magnetohydrodynamic internal combustion electric generator which utilizes the cylinders and pistons in multiples so that generated electric impulses when passed through a common transformer will provide alternating current flow of economically useful frequencies.

Another object of this invention is to provide a new and improved magnetohydrodynamic internal combustion electric generator in which the output can be controlled by the speed of the internal combustion engine or the strength of the magnetic field.

A still further object of this invention is the provision of an electric power generator which eliminates the conversion of combustion power into mechanical power before generation into electrical energy while the accessory power needed by the generator is provided by that power not converted into electrical energy.

Other objects will appear hereinafter.

For the purpose of illustrating the invention there is shown in the drawings a form which is presently preferred; it being understood, however, that this invention is not limited to the precise arrangements and instrumentalities shown.

Figure 1:
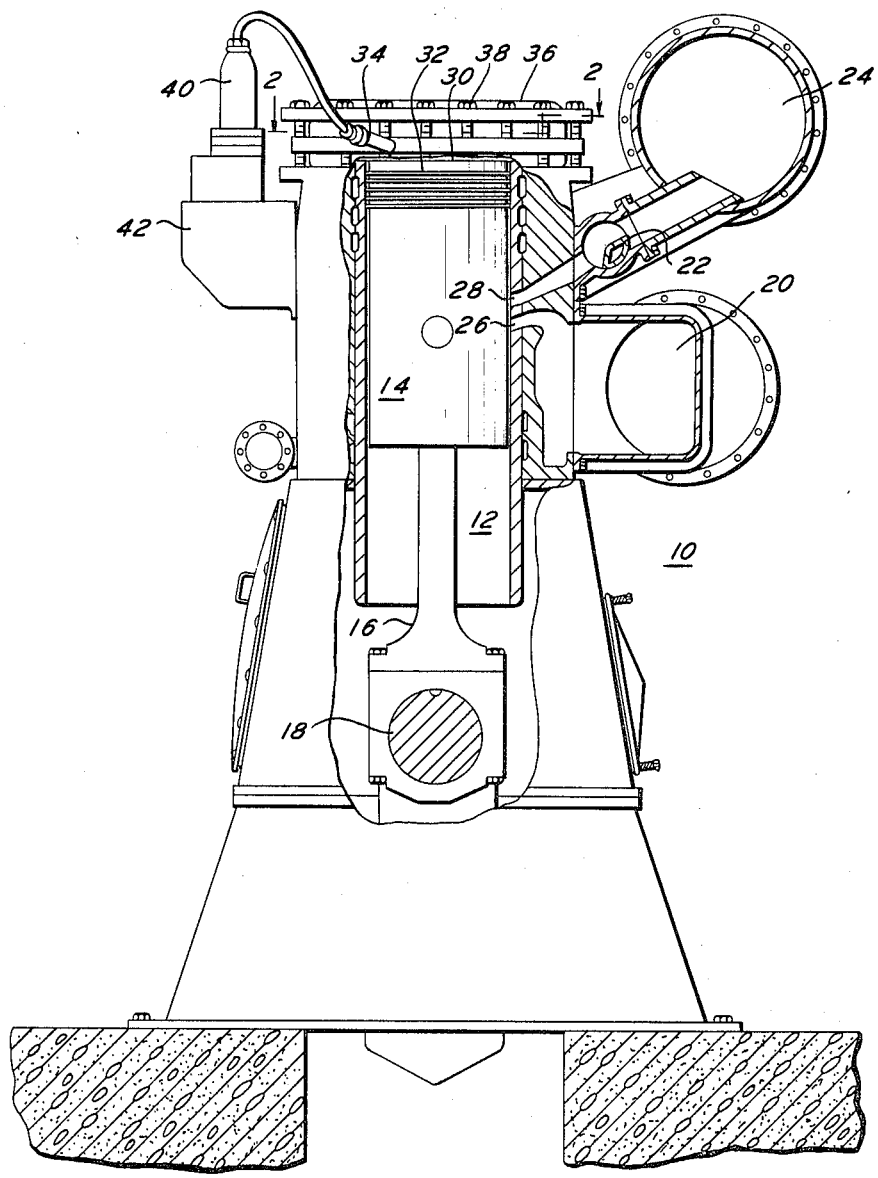
FIGURE 1 is a partially cross-sectionalized front elevational view of one cylinder of a two cycle diesel engine utilizing the principles of the present invention.

The objects of the present invention are accomplished by the provision of a two cycle diesel engine having a combustion chamber formed as an annular torus around the piston and cylinder heads. The annular chamber is shaped between the pole pieces of a strong permanent magnet or electromagnet. Current collectors are placed on the faces of the electromagnet so as to insulate the magnet from the high temperature of the combustion chamber while collecting electrons as they flow from the gas. When the piston of the diesel is at top dead center, fuel is injected into the chamber to cause combustion. By correct volume proportions and combustion timing the approximate compression plus combustion temperatures will approach the desirable 3000° C. during the short but distinct period of the piston cycle. This occurs when maximum mass flow due to the decrease in volume of the cylinder bore coincides with the major portion of the fuel combustion. The resultant high temperature combustion together with the high displacement velocity in the region of the primary combustion contact of fuel and air plus the physically diminishing air gap between the insulated pole shoes establishes the required three magnetohydrodynamic conditions.

These conditions as stated previously are temperature, velocity and magnetic field. The energy produced is a short pulse which can be varied by changing the rate of fuel combustion or the magnetic field. In a multi-cylinder engine, these pulses can be combined to form an alternating current output which may be fed through a common transformer for use with a load circuit.

The thermodynamic energy remaining after the generation of electric power during the combustion period is mainly used to provide the scavenging air flow at the opposite stroke end position and air compression energy during the following compression stroke cycle. The necessary timely distribution of this energy occurs through the connecting rods and crankshafts to an attached blower or through a compressor and bounce piston attached to the power piston similar to free piston compressors or gasifier engines. The blower can be used to provide the scavenging air flow necessary for the diesel operation.

Any power not absorbed electrically or in the air cycle can be utilized to drive a conventional electric generator or any other means of useful power absorption.

The principles of the present invention can be applied to the use of an atomic fuel gas with the space and volumes arranged so that the gas becomes critical at the time of maximum displacement flow and thus will provide the required temperatures. Of course, with an atomic fuel gas it will be necessary to have hermetically separated components for piston guidance and labyrinth piston sealing and mechanical or pneumatic power transfer from the piston to the accessory power section of the engine in order to provide the required sealing of the atomic fuel supply as well as avoiding fuel contamination by lubricating elements.

With reference to the drawings, there is shown in FIGURE 1 a one cylinder, two cycle diesel engine generally designated by the numeral 10. The diesel engine 10 includes a cylinder 12 within which is reciprocally mounted a piston 14. The piston 14 is operative through a connecting rod 16 to turn a crankshaft 18.

An air manifold 20 is mounted on the side of the diesel engine 10 below a rotary valve 22 and exhaust manifold unit 24. The air manifold 20 is connected to the cylinder 12 through an inward port 26. The inward port 26 is spaced below an exhaust port 28 on the wall of the cylinder 12. The exhaust port 28 connects the exhaust manifold 24 to the cylinder 12 through the rotary valve 22.

Figure 2:
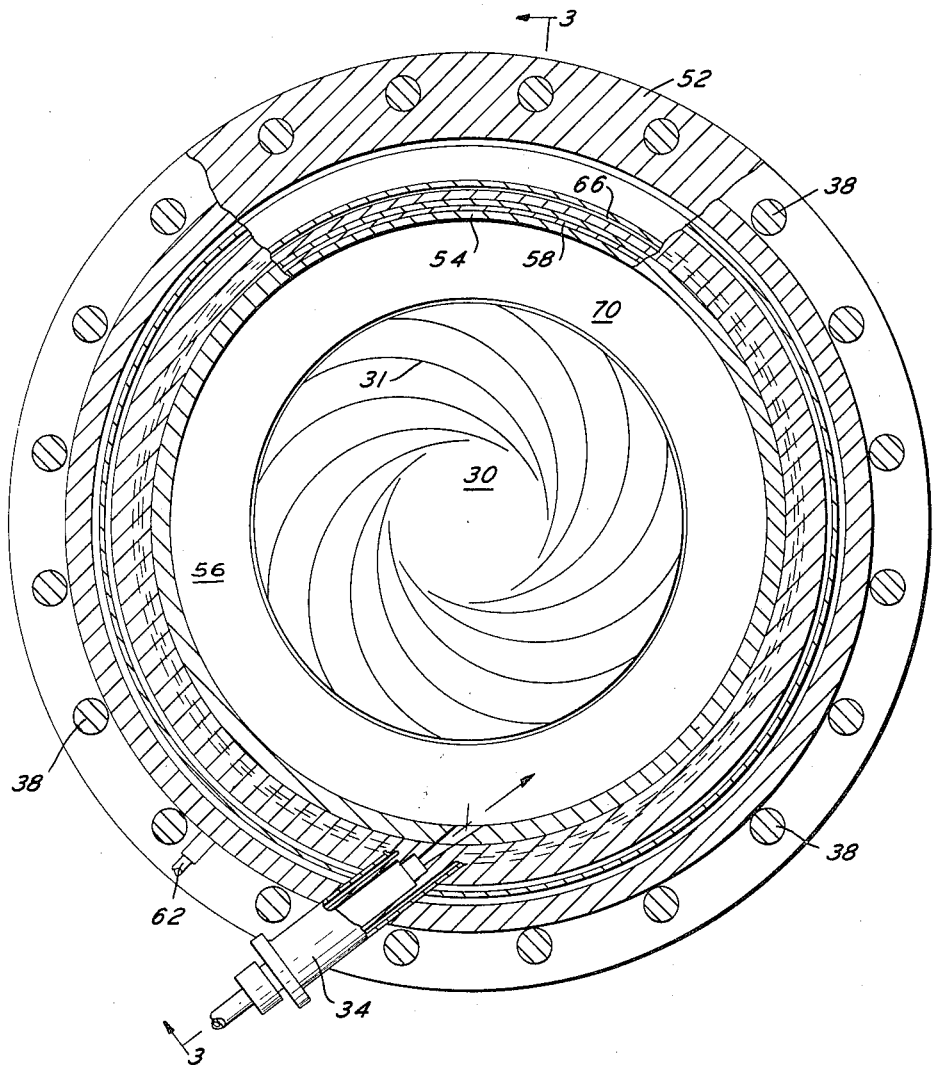
FIGURE 2 is a top plan cross-sectional view taken along lines 2—2 of FIGURE 1.
Figure 3:
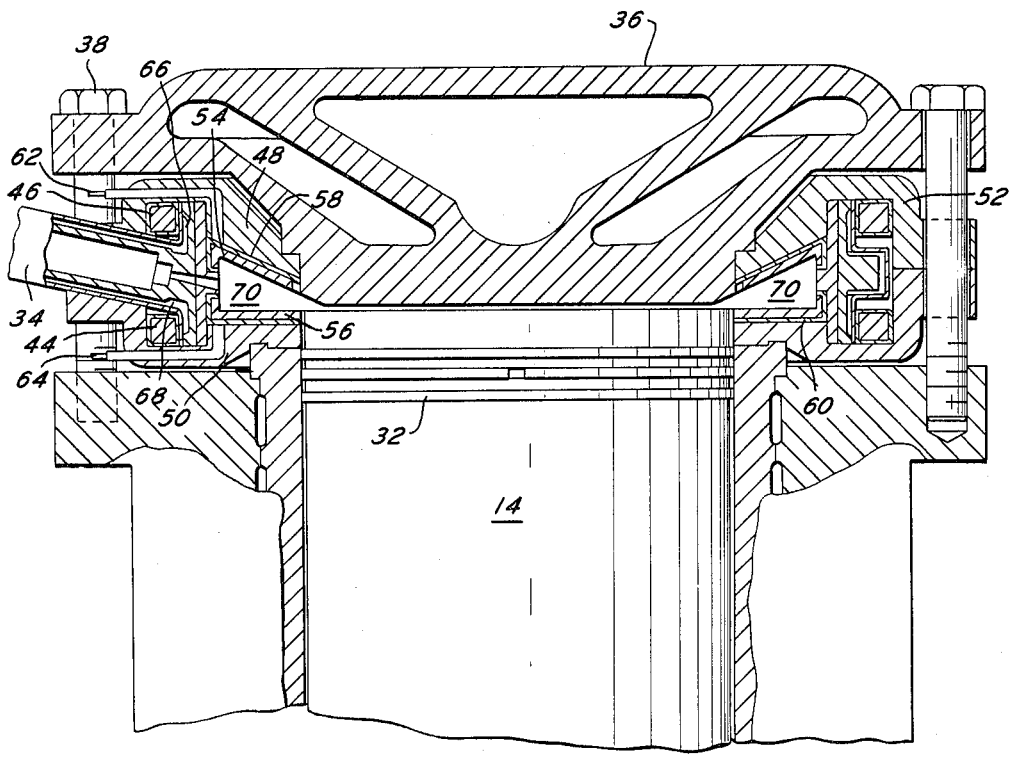
FIGURE 3 is a cross-sectional view of the piston head shown in FIGURE 2 taken along lines 3—3.

As can best be seen with reference to FIGURES 2 and 3, the piston 14 has a piston head 30 around which are located piston rings 32 effecting a seal between the reciprocally mounted piston 14 and the cylinder 12. The piston head 30 has spiral turbulence grooves 31 to induce rotary turbulence in the combustion chamber in the direction of the fuel streams for uniform distribution of the combustion products and processes during the complete duration of the combustion period.

A fuel injection nozzle 34 is mounted on the engine head 36. Only one fuel injection nozzle has been shown although it will be understood that as many fuel injection nozzles may be utilized as are desired on a single cylinder. The engine head 36 is held in place by bolts 38 secured around the periphery thereof.

A fuel injector 40 mounted on the engine 10 to feed the nozzle 34 is controlled by a cam shaft in housing 42. The cam shaft in housing 42 maintains positive time sequences for all cylinders of the diesel engine.

Two annular coils 44 and 46 are placed around an annular north pole piece 48 and an annular south pole piece 50 spaced from the top dead center position of the piston 14 shown in FIGURE 8.

The north and south pole pieces 48 and 50 are integral through a ferromagnetic yoke 52 to form a complete ferromagnetic path with an air gap between the pole faces. The north pole piece 48 has a top electron collector plate 54 on the face thereof separated by a top insulator 58. The south pole piece 50 has a bottom annular current collector plate 56 thereon separated by a bottom annular insulator 60. Lead wires 62 and 64 are connected to the top collector plate 54 and bottom collector plate 56 respectively. The annular space between the top and bottom collector plates 54 and 56 forms an annular combustion chamber generally designated by the reference numeral 70. Those portions of the structure which are exposed to the high temperature gases within the annular chamber 70 may be provided with a ceramic coating or any other suitable electrical and thermal insulation. The insulators 58 and 60 are also manufactured of a ceramic material so as to provide electrical and thermal insulation between the collector plates and their associated pole pieces.

The injection fuel nozzle 34 feeds the annular combustion chamber 70 and is cooled by water jackets 66 and 68 to protect it from the heat generated in the combustion chamber 70.

In operation, when the piston 14 approaches top dead center the air in the cylinder 12 is forced into the annular combustion chamber 70 as the fuel injector 34 directs a spray of fuel at the piston head. When this occurs, combustion takes place and a high velocity dynamic gas flow at temperatures approaching 3000° C. occurs. The gas is moving at high velocity through the annular combustion chamber 70 through the magnetic field between the pole pieces 48 and 50. The coils 46 and 44 create the magnetic field through the yoke 52 and pole pieces 48 and 50 so that by the well recognized theory of magnetohydrodynamics the electrons ionized in the gas are collected on the plates 54 and 56 with a resultant current flow therethrough. This current is fed through lead wires 62 and 64 to a suitable load.

After the combustion period the piston 14 is forced downwardly by the constant pressure of the combustion gases. As the exhaust port 28 is uncovered the rotary valve 22 is out of the gas path and permits a free passage of exhaust gas into the exhaust manifold 24. When the piston 14 completes the blowdown period, the scavenging port or exhaust port 28 opens. Cylinder pressure is below the pressure in the air manifold 20 thus accelerating the beginning of the actual scavenging air flow. The departing exhaust gas slug acts as a retreating piston further aiding the scavenging by creating a partial vacuum in the cylinder 12. At lower dead center, the cylinder pressure reaches the scavenging air manifold pressure and a full flow of clean air is purging and charging the cylinder.

The scavenging air pressure is maintained in the cylinder until the scavenging or inlet port 26 is closed. The inlet port 26 closes simultaneously with the closing of the exhaust port 28 by the rotary valve 22. By the time the exhaust port 28 is fully closed by the piston 14 the pressure in the cylinder has started to increase. The compression stroke of the piston then completes the cycle.

Figure 4:
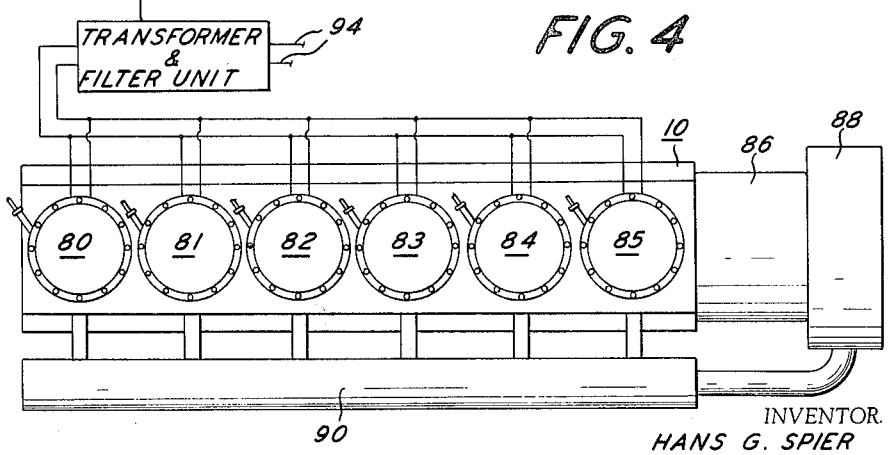
FIGURE 4 is a schematic showing of a six cylinder diesel engine utilized to generate electrical energy through magnetohydrodynamic principles.

In FIGURE 4 there is shown the diesel engine 10 with six cylinders 80–85. The shaft of the diesel engine 10 is adapted to be connected through a gear reducer unit 86 to a blower 88. The blower 88 provides the scavenging air flow to an air manifold 90 connected to each of the cylinders 80–85. If desired, the crankshaft of the diesel engine 10 could also be connected to a conventional electric generator to absorb any free power components not absorbed electrically or by the blower 88. The cylinders 80–85 have their magnetohydrodynamic current collector wires connected through a transformer and filter unit 92. At the output 94 of the transformer and filter unit 92 there will appear an alternating current whose frequency is determined by the speed of the diesel engine 10.

For each pulse produced by a single cylinder, there are two output pulses from a transformer 92 due to the two changes in voltage generated by the particular cylinder. These changes are the leading and trailing edges of the pulse generated. Thus, if the diesel engine was operated at 300 r.p.m., the resultant alternating current at terminals 94 would have a frequency of 60 cycles per second.

The present invention may be embodied in other specific forms without departing from the spirit or essential attributes thereof and, accordingly, reference should be made to the appended claims, rather than to the foregoing specification as indicating the scope of the invention.

I claim:
1. Apparatus comprising an internal combustion engine having a cylinder and a piston reciprocating therein, said piston and cylinder forming a combustion chamber, means for selectively supplying fuel to said combustion chamber wherein the fuel is burned to produce combustion products moving at high velocity and high temperature, magnetic means for producing a magnetic field in said combustion chamber, and current collecting means associated with said magnetic means for collecting electrons from the fuel combustion products moving through the magnetic field produced by said magnetic means.

2. The apparatus of claim 1 including insulating means for insulating said current collecting means from said magnetic means.

3. The apparatus of claim 1 wherein said magnetic means includes a magnet having opposed pole faces with an air gap therebetween, said air gap forming a part of said combustion chamber.

4. The apparatus of claim 3 wherein said current collecting means include current collecting plates located within said air gap, said current collecting plates being electrically and thermally insulated from said magnet.

5. The apparatus of claim 3 wherein said means for selectively supplying fuel to said combustion chamber is adapted to supply fuel between said pole faces, said piston having one position with respect to said cylinder wherein fuel in said combustion chamber will be burned, said means for selectively supplying fuel being adapted to supply fuel between said pole faces only when said piston is in said one position.

6. The apparatus of claim 5 wherein said piston includes a piston face, said piston face having turbulence grooves thereon for uniform distribution of the fuel supplied to said combustion chamber.

7. Apparatus comprising a multi-cylinder internal combustion engine, means defining combustion chambers for each of said cylinders, second means for selectively supplying fuel to each of said combustion chambers wherein combustion of the fuel takes place, magnetic means for producing a magnetic field in each of said combustion chambers, current collecting means associated with each of said magnetic means for collecting electrons from ionized fuel combustion products in said combustion chamber, and means for combining the currents received by each of the current collecting means associated with each cylinder into a single source of alternating current.

8. The apparatus of claim 7 wherein said internal combustion engine is operative to provide mechanical energy, and mechanical energy absorbing means for absorbing mechanical energy produced by said internal combustion engine after said electrical power is absorbed by said current collecting means.

9. A magnetohydrodynamic generator comprising an internal combustion engine having a combustion chamber therein, magnetic means for producing a magnetic field in said cobustion chamber, and electrode means spatially associated with said magnetic field for conducting current generated by the interaction of said magnetic field and ionized combustion products of said internal combustion engine.

10. A magnetohydrodynamic generator comprising an internal combustion engine having an annular combustion chamber, said internal combustion engine being adapted to develop at least a partially ionized gaseous combustion product moving at a high velocity in said annular combustion chamber, magnetic means for producing a magnetic field in said combustion chamber, and electrode means associated with said combustion chamber and magnetic means for conducting current generated by the interaction of said ionzied gaseous products and said magnetic field.

11. A magnetohydrodynamic generator comprising an internal combustion engine having cylinder means and a piston reciprocable therein, said piston and said cylinder means forming a combustion chamber, means for selectively supplying fuel to said combustion chamber wherein the fuel is burned to provide partially ionized combustion products moving at a high velocity and high temperature, magnetic means for producing a magnetic field in said combustion chamber, and electrode means associated with said magnetic means for conducting current generated by the fuel combustion products moving through the magnetic field produced by said magnetic means.

12. Apparatus comprising an internal combustion engine having a cylinder and a piston reciprocating therein, said piston and cylinder forming a combustion chamber, means for selectively supplying fuel to said combustion chamber wherein the fuel is burned to produce ionized combustion products moving at a high velocity, magnetic means for producing a magnetic field in said combustion chamber, and current collecting means associated with said magnetic means for collecting electrons from the fuel combustion product moving through the magnetic field produced by said magnetic means, said magnetic means including a magnet having opposed pole faces with an air gap therebetween, said air gap forming a part of said combustion chamber, said current collecting means including current collecting plates located within said air gap, and said magnetic and said current collecting plates being annular in shape and co-axial with said cylinder and piston.

13. A magnetohydrodynamic generator comprising an internal combustion engine having a cylinder and a piston reciprocable therein, magnetic field producing means including spaced apart annular magnetic pole pieces co-axial of said cylinder, an annular zone between said pole pieces for the flow of combustion products, means for selectively supplying fuel to said cylinder and annular zone wherein fuel is burned to provide ionized combustion products moving at a high velocity, and electrode means positioned adjacent said annular zone for conducting current generated by the flow of ionized combustion products moving through a magnetic field produced by said magnetic means.

14. Apparatus in accordance with claim 13 wherein said piston includes a piston face, the piston face having turbulence grooves thereon for inducing rotary flow of combustion products in the annular zone.

References Cited by the Examiner

UNITED STATES PATENTS

| | | | |
|---|---|---|---|
| 2,951,473 | 9/1960 | Bodine | 123—191 |
| 3,105,153 | 9/1963 | James | 290—1 |
| 3,161,790 | 12/1964 | Percival | 310—11 |

FOREIGN PATENTS 738,511  10/1955  Great Britain.

MILTON O. HIRSHFIELD, *Primary Examiner.*

DAVID X. SLINEY, *Examiner.*